United States Patent
Branson et al.

(10) Patent No.: US 11,921,724 B2
(45) Date of Patent: *Mar. 5, 2024

(54) WINDOWING ACROSS OPERATORS IN A STREAMING ENVIRONMENT

(71) Applicant: International Business Machines Corporation, Armonk, NY (US)

(72) Inventors: Michael J. Branson, Rochester, MN (US); Jay S. Bryant, Rochester, MN (US); James E. Carey, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

This patent is subject to a terminal disclaimer.

(21) Appl. No.: 16/131,595

(22) Filed: Sep. 14, 2018

(65) Prior Publication Data

US 2019/0018882 A1 Jan. 17, 2019

Related U.S. Application Data

(63) Continuation of application No. 14/751,742, filed on Jun. 26, 2015, now Pat. No. 10,133,784, which is a (Continued)

(51) Int. Cl.
*G06F 16/2455* (2019.01)
*G06F 16/2453* (2019.01)
*G06F 16/28* (2019.01)

(52) U.S. Cl.
CPC .. *G06F 16/24568* (2019.01); *G06F 16/24542* (2019.01); *G06F 16/24549* (2019.01); *G06F 16/283* (2019.01)

(58) Field of Classification Search
CPC ......... G06F 16/24568; G06F 16/24542; G06F 16/24549; G06F 16/283
See application file for complete search history.

(56) References Cited

U.S. PATENT DOCUMENTS 7,613,848 B2 11/2009 Amini
7,644,110 B2 1/2010 Nishizawa
(Continued)

FOREIGN PATENT DOCUMENTS

WO 2013078682 A1 6/2013

OTHER PUBLICATIONS

Ballard et al., "IBM InfoSphere Streams: Harnessing Data in Motion," IBM Redbooks, Sep. 2010, 360 pages, © Copyright International Business Machines Corporation 2010.
(Continued)

*Primary Examiner* — Charles D Adams
(74) *Attorney, Agent, or Firm* — Jared C. Chaney

(57) ABSTRACT

A stream computing application may be configured to manage the flow of tuples through a section of an operator graph. A window may be generated over one or more stream operators. The window may include breakpoint thresholds that set the maximum flow of tuples within the window. The stream operators within the window may be monitored to determine the flow of tuples occurring within the window using tuple flow counts. The tuple flow counts may be compared to the breakpoint thresholds to determine whether a breakpoint condition has occurred. If a breakpoint condition has occurred, a tuple flow change may be implemented to reduce the flow of tuples within the window.

18 Claims, 8 Drawing Sheets

Related U.S. Application Data continuation of application No. 14/707,201, filed on May 8, 2015, now Pat. No. 10,042,891.

(56) References Cited

U.S. PATENT DOCUMENTS

| | | | |
|---|---|---|---|
| 8,095,690 B2 | 1/2012 | Kashiyama | |
| 8,560,526 B2 | 10/2013 | Santosuosso | |
| 9,298,788 B1 | 3/2016 | Kekre | |
| 9,853,878 B2 | 12/2017 | Branson | |
| 10,042,891 B2* | 8/2018 | Branson | G06F 16/24549 |
| 10,133,784 B2* | 11/2018 | Branson | G06F 16/283 |
| 2006/0133678 A1 | 6/2006 | Yokota | |
| 2008/0005392 A1 | 1/2008 | Amini | |
| 2009/0238277 A1 | 9/2009 | Meehan | |
| 2011/0239048 A1* | 9/2011 | Andrade | G06F 11/3616 |
| | | | 714/E11.178 |
| 2012/0179809 A1* | 7/2012 | Barsness | H04L 41/22 |
| | | | 709/224 |
| 2012/0218268 A1 | 8/2012 | Accola | |
| 2012/0311172 A1 | 12/2012 | Branson | |
| 2013/0080413 A1 | 3/2013 | Chen | |
| 2013/0179591 A1 | 7/2013 | Branson | |
| 2013/0290489 A1 | 10/2013 | Branson | |
| 2013/0305227 A1 | 11/2013 | Branson | |
| 2014/0089929 A1* | 3/2014 | Branson | H04L 69/22 |
| | | | 718/102 |
| 2014/0095503 A1 | 4/2014 | Branson | |
| 2014/0095506 A1* | 4/2014 | Branson | G06F 16/20 |
| | | | 707/737 |
| 2014/0181144 A1 | 6/2014 | Kashiyama | |
| 2015/0248462 A1 | 9/2015 | Theeten | |
| 2016/0241770 A1 | 8/2016 | Su | |
| 2016/0328464 A1 | 11/2016 | Branson | |
| 2018/0069777 A1 | 3/2018 | Branson | |

OTHER PUBLICATIONS

List of IBM Patents or Patent Applications Treated as Related, signed Sep. 13, 2018, 2 pgs.

* cited by examiner

WINDOWING ACROSS OPERATORS IN A STREAMING ENVIRONMENT

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

Embodiments of the present disclosure include a method for managing the flow of tuples through a section of an operator graph using a window. A window may be generated over one or more stream operators. The window may include breakpoint thresholds that set the maximum flow of tuples within the window. The stream operators within the window may be monitored to determine the flow of tuples occurring within the window using tuple flow counts. The tuple flow counts may be compared to the breakpoint thresholds to determine whether a breakpoint condition has occurred. The occurrence of a breakpoint condition may indicate that the flow of tuples within the window has exceeded the maximum tolerable flow of tuples. If a breakpoint condition has occurred, a tuple flow change may be implemented to reduce the flow of tuples within the window. Additional embodiments of the present disclosure are directed to a system and a computer program product for managing the flow of tuples through a section of an operator graph using a window.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

Figure 1:
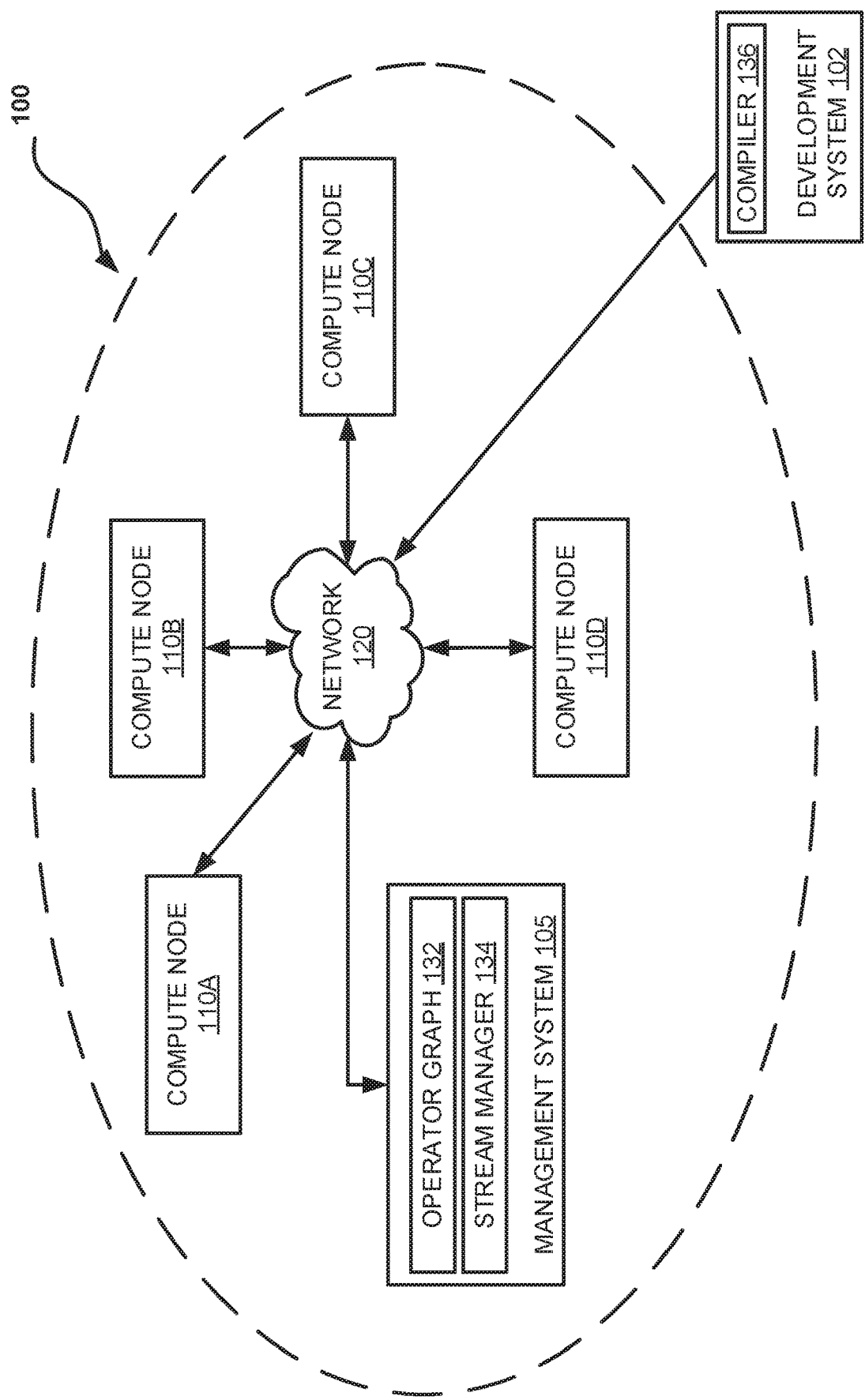
FIG. 1 illustrates a computing infrastructure configured to execute a stream computing application, according to various embodiments.

The present disclosure relates to stream computing, and in particular, to computing applications that receive streaming data and process the data as it is received. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using interprocess communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

As used herein, a "flow of tuples" refers to both the transmission of tuples between stream operators or processing elements and the creation of tuples within stream operators. The creation or transmission of a single tuple (or a single group of tuples, if created or transmitted together) is referred to as a "tuple flow event." A "breakpoint threshold" is a threshold used to limit and control the flow of tuples within a section of an operator graph covered by a window. For example, a breakpoint threshold may set the maximum number of tuples that may be created by stream operators within a window during the windowing period.

"Tuple flow counts" track the flow of tuples within a window. Each tuple flow count may have a corresponding breakpoint threshold. For example, if a breakpoint threshold sets the maximum number of tuples created in a window, a tuple flow count may be kept that records how many tuples have actually been created by stream operators inside the window. A "tuple flow change" is a change to some portion of the operator graph (e.g., to a stream operator or execution path) to alter the flow of tuples within a window. For example, in order to reduce the flow of tuples inside a window, an implemented tuple flow change may cause one or more stream operators to stop transmitting tuples for a period of time.

A stream computing application may include one or more windows to manage the flow of tuples in specific sections of an operator graph. A "window," as referred to in this description and the claims, is a logical container for processing elements or stream operators. A window may allow for the creation of subsets or groups of processing elements or stream operators, and may be used to establish a set of rules that apply to the subset of processing elements or stream operators inside the window.

A window may be a tumbling or sliding window. Both tumbling and sliding windows may be specified by a reset policy. The reset policy determines the size of the window, also known as the windowing period. When the reset policy for a tumbling window is met, the tuple flow counts are reset for the window. With respect to a tumbling window, the "conclusion" of the window, in this description and the claims, may refer to when the reset policy for a tumbling window is met or triggered. For example, a reset policy for a tumbling window may indicate that the window will last for 5 minutes. Once it has been 5 minutes since the tumbling window was generated, the window may conclude and the tuple flow counts may be reset.

The reset policy of a tumbling window may be based on a time interval (e.g., the window lasts for 5 minutes), a delta, or punctuation. A delta is a time difference between consecutive tuple flow events. For example, if 3 minutes passes between tuple flow events inside a tumbling window, the reset policy may be triggered and the tuple flow counts may be reset. A punctuation is a control signal that appears interleaved with the tuples in a stream. Punctuation appears in the data flow and may, for example, notify a stream operator of the grouping of tuples to be processed.

The reset policy for a sliding window may define the sliding window's windowing period. In contrast to a tumbling window, a sliding window does not reset the tuple flow counts when a reset policy is met. Instead, a sliding window may dynamically adjust the tuple flow counts such that at any given point, the tuple flow counts may indicate the flow of tuples within the window over the last X minutes, where X is the windowing period as defined by the reset policy. In this way, a sliding window maintains the size of the window as specified by the windowing period. For example, a stream manager may create a sliding window over two stream operators. The sliding window may have a windowing period of 3 minutes. Tuple flow counts may be kept for the window. At any given moment, the tuple flow counts for the window may indicate how many tuples were generated by, or transmitted to/from, the stream operators within the window over the previous 3 minutes.

A window may be defined by a set of windowing conditions. "Windowing conditions," as used in this description and the claims, may include conditions used to describe the type of window (e.g., tumbling or sliding), the reset policy, and the set of rules that apply to the subset of processing elements or stream operators inside the window (e.g., the breakpoint thresholds). Windowing may be specified in any number of ways. For example, an application programmer may define one or more specific windowing conditions. Additionally, the system may provide a set of windowing conditions.

A stream operator subject to the windowing conditions (e.g., the breakpoint thresholds) is considered inside the window, while a stream operator that is not subject to the windowing conditions is considered outside the window. The creation of a tuple by a stream operator is considered to have occurred inside a window if the stream operator is inside the window. Likewise, the creation of a tuple by a stream operator outside the window is considered to occur outside the window. A tuple transmitted from a stream operator outside the window to a stream operator inside the window is considered to "enter" the window. A tuple transmitted from a stream operator inside the window to a stream operator outside the window is considered to "exit" the window. A tuple transmitted between two stream operators outside of the window is considered to occur outside the window, while a tuple transmitted between two stream operators inside the window is considered to occur inside the window.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
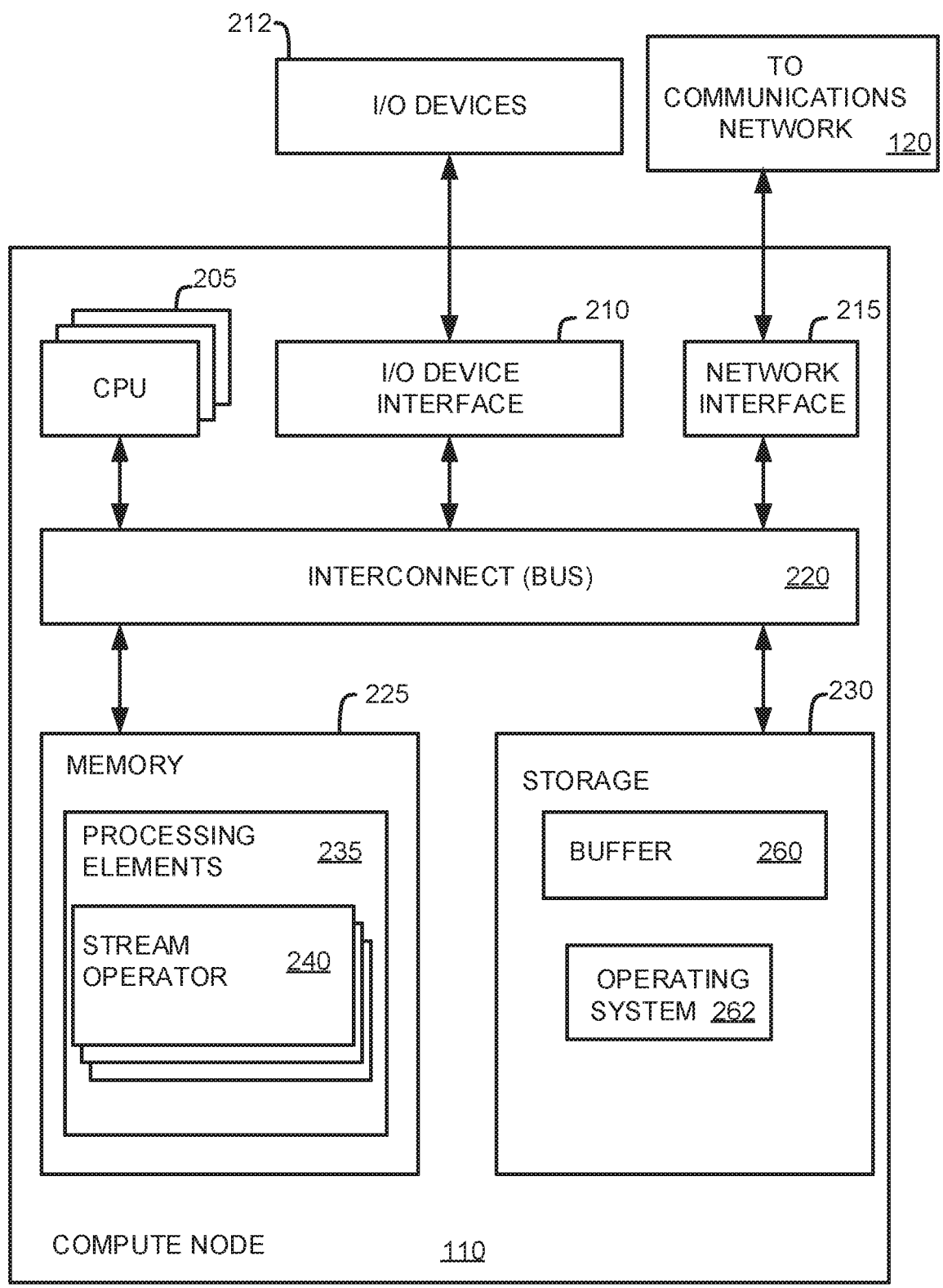
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
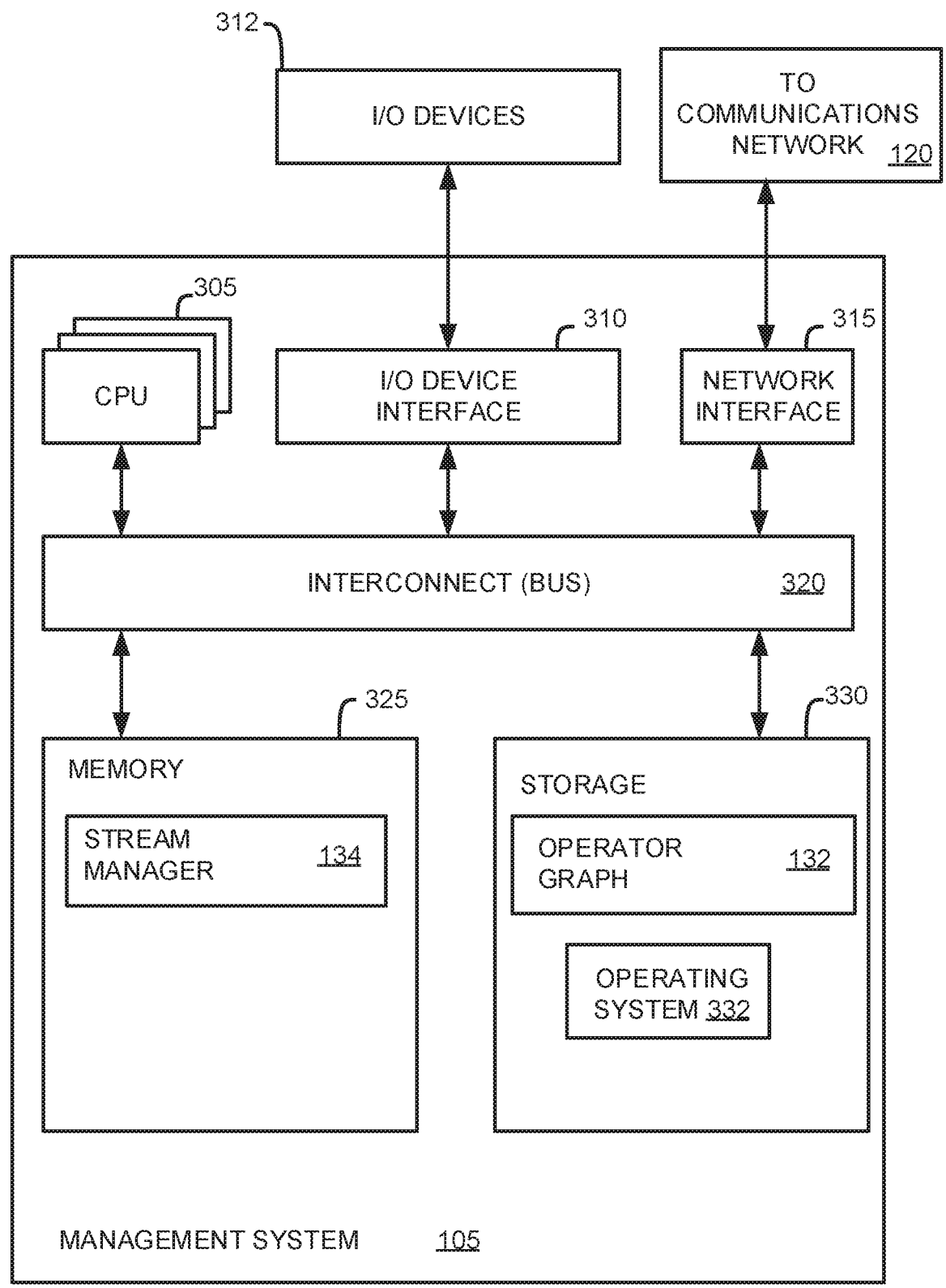
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
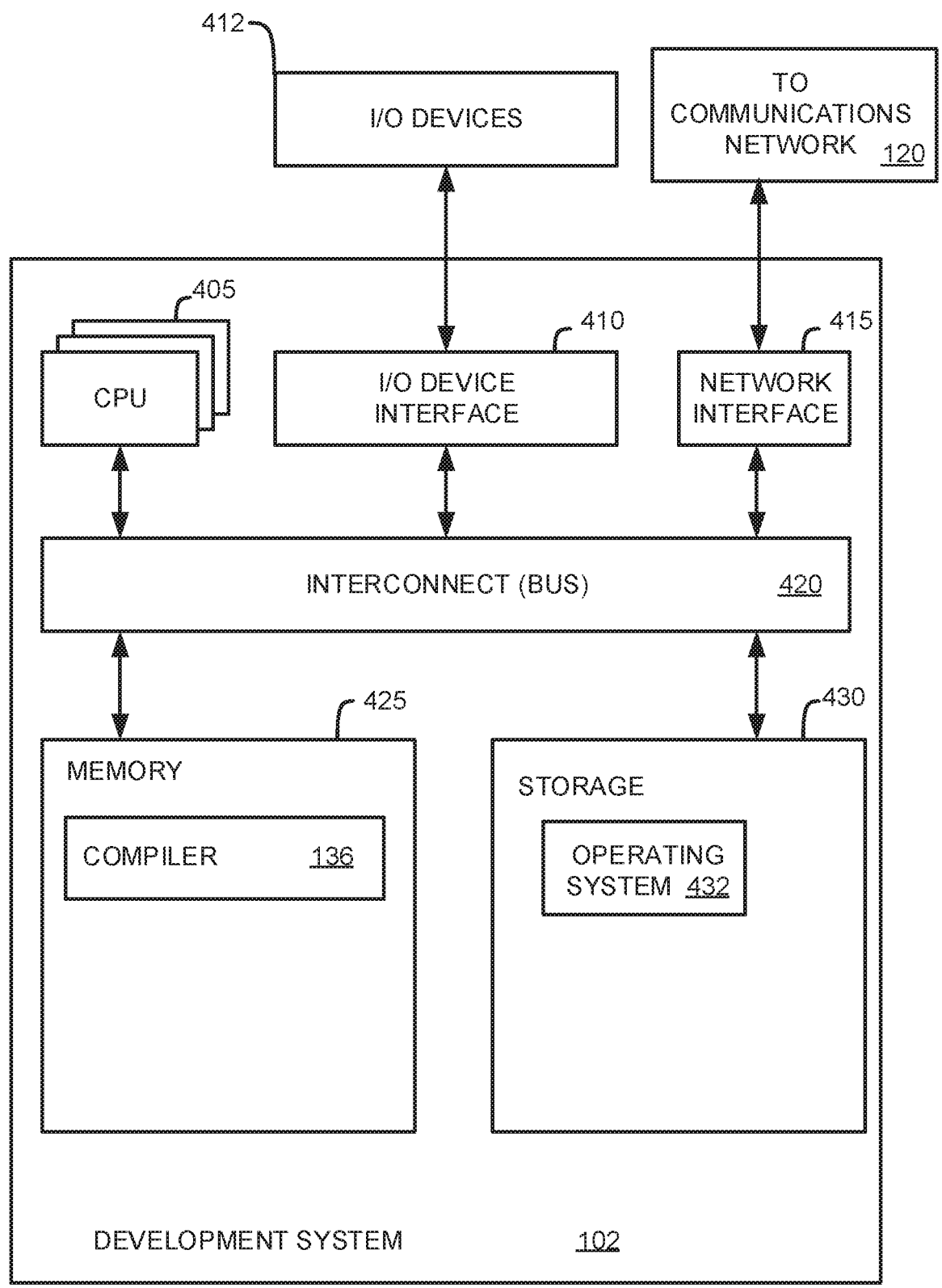
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
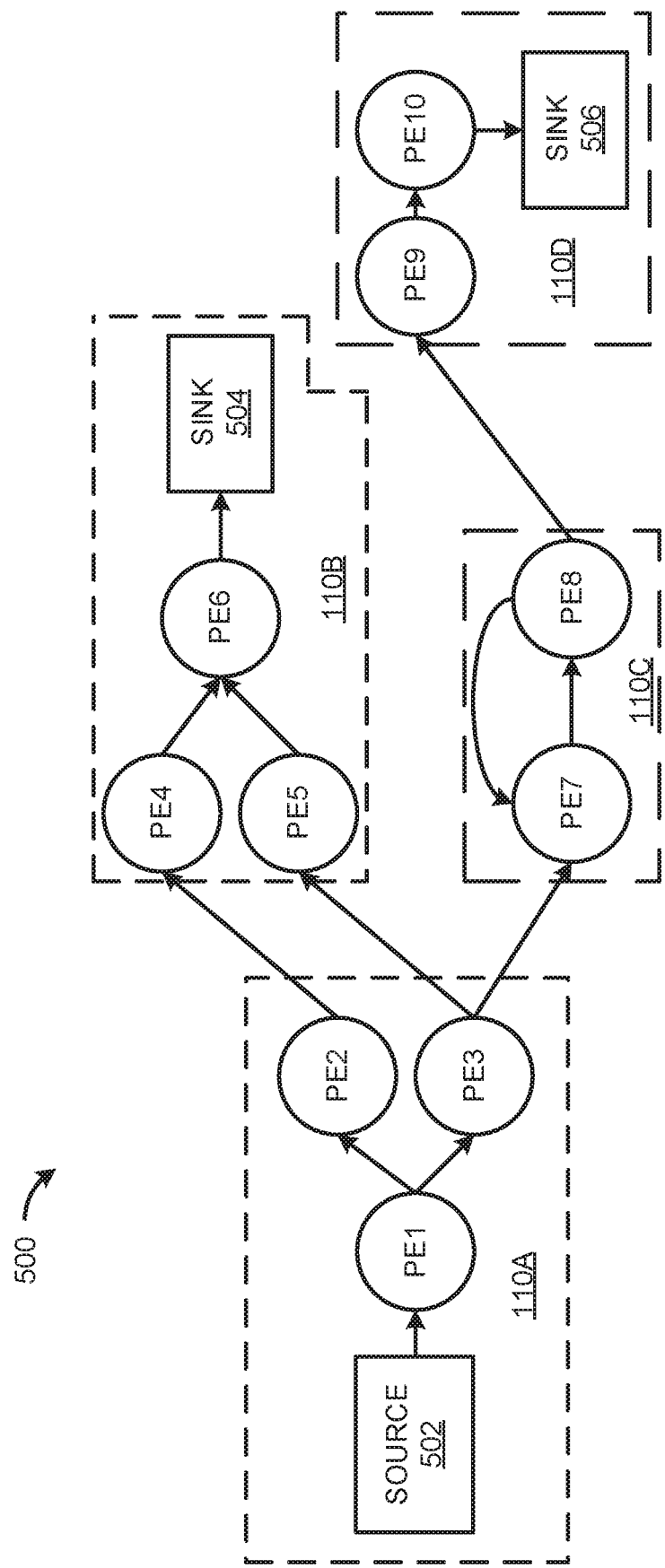
FIG. 5 illustrates an operator graph for a stream computing application, according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 before being transmitted to a sink 504. Similarly, tuples flowing from PE3 to PE5 also reach PE6 and are sent to a sink 504. Thus, PE6 could be configured to perform a join operation, combining tuples received from PE4 and PE5, before sending the data to the sink 504. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in PE10 before being sent to a sink 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML, documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
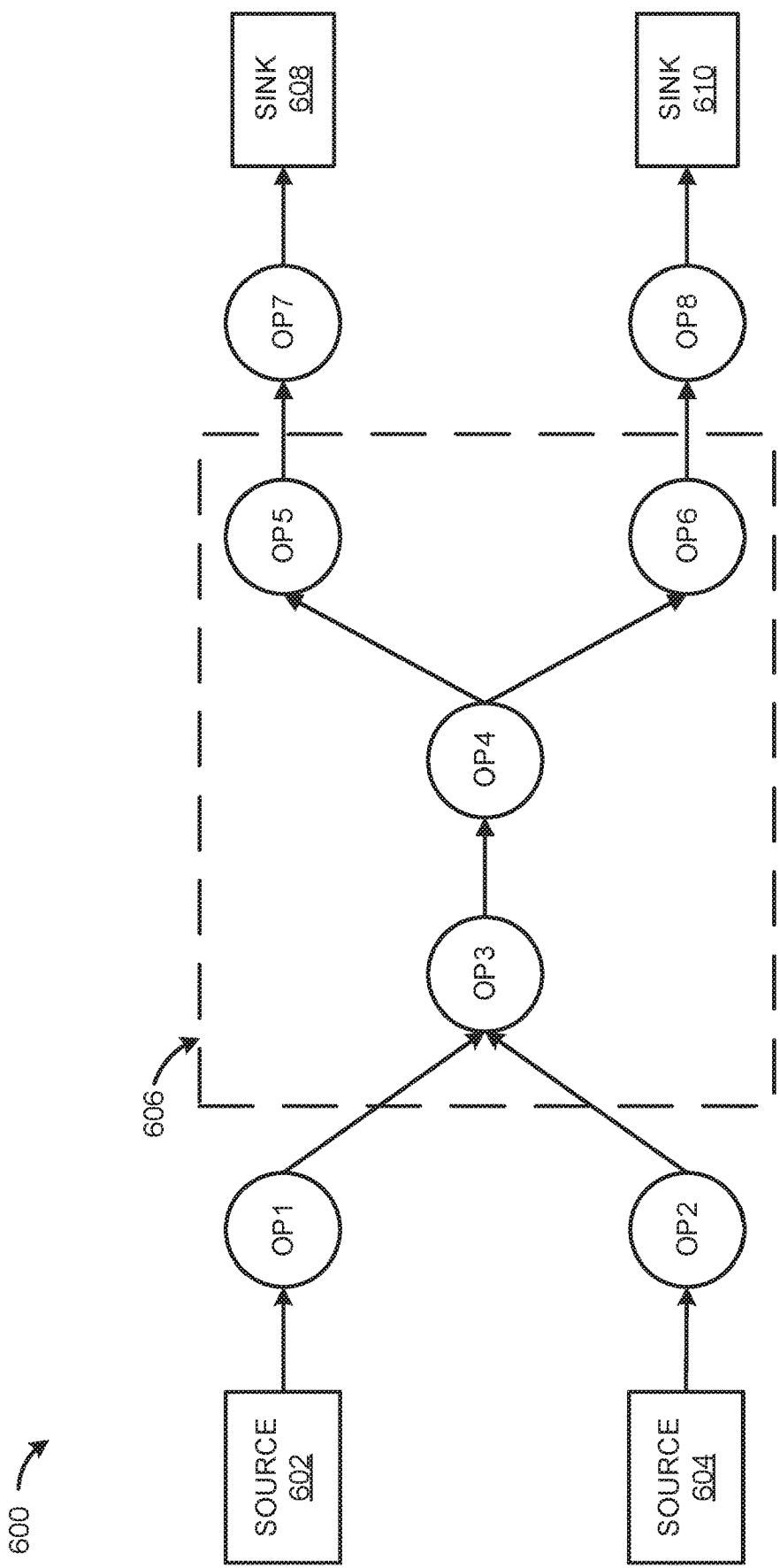
FIG. 6 illustrates an example of an operator graph of a stream computing application in which illustrative embodiments of the present disclosure may be implemented.

Referring now to FIG. 6, shown is an example of an operator graph 600 of a stream computing application in which illustrative embodiments of the present disclosure may be implemented. The stream computing application shown in FIG. 6 is a simple application used for illustrative purposes. Embodiments of the present disclosure may be implemented in stream computing applications with greater complexity than shown in FIG. 6.

The operator graph 600 consists of two sources 602, 604 eight stream operators OP1-8, a window 606, and two sinks 608, 610. A window 606 is shown encompassing four stream operators OP3-6. That is to say, the two sources 602 and 604, the two sinks 608 and 610, and the first, second, seventh, and eight stream operators OP1, OP2, OP7, and OP8 are outside of the window 606, while the third, fourth, fifth, and sixth stream operator OP3-6 are inside the window.

Information enters the stream computing application through the two sources 602 and 604. The information may be any form of data, whether structured or unstructured, e.g., sensor data or image data. The first source 602 may output tuples of data to the first stream operator OP1 and the second source 604 may output tuples of data to the second stream operator OP2. The first and second operators OP1 and OP2 may be configured to perform an operation on the tuples they receive from their respective source, and then to output tuples to third stream operator OP3. Tuples of data output from the first or second stream operators OP1 and OP2 to the third stream operator OP3 may be viewed as entering the window 606 because the first and second operators are outside of the window, while the third stream operator is inside the window.

The third stream operator OP3 may perform an operation on the tuples it receives and output tuples to the fourth stream operator OP4. The fourth stream operator OP4 may split the tuples, sending copies to the fifth stream operator OP5 and to the sixth stream operator OP6. All of the creation and transmission of tuples that occurs between the third stream operator OP3 creating tuples and the fifth and sixth stream operators OP5 and OP6 receiving, processing, and generating tuples may be considered as happening within the window 606 because the third through sixth stream operators OP3-6 are inside the window.

The fifth stream operator OP5 may perform an operation on the tuples it receives from the fourth stream operator OP4 before outputting tuples of data to the seventh stream operator OP7. The tuples transmitted from the fifth stream operator OP5 to the seventh stream operator OP7 may be considered as exiting the window 606 because the fifth stream operator is inside the window while the seventh stream operator is outside the window. The seventh stream operator OP7 may then perform an operation on the tuples it receives and output tuples to the first sink 608. The creation of tuples by the seventh stream operator OP7 and the transmission of the tuples to the first sink 608 are considered to have occurred outside of the window 606 because neither the seventh stream operator nor the first sink are inside the window.

The sixth stream operator OP6 may perform an operation on the tuples it receives from the fourth stream operator OP4 before outputting tuples of data to the eighth stream operator OP8. The tuples transmitted from the sixth stream operator OP6 to the eighth stream operator OP8 may be considered as exiting the window 606 because the sixth stream operator is inside the window while the eighth stream operator is outside the window. The eighth stream operator OP8 may then perform an operation on the tuples it receives and output tuples to the second sink 610. The creation of tuples by the eighth stream operator OP8 and the transmission of the tuples to the second sink 610 are considered to have occurred outside of the window 606 because both the eighth stream operator and the second sink are outside the window.

Figure 7A:
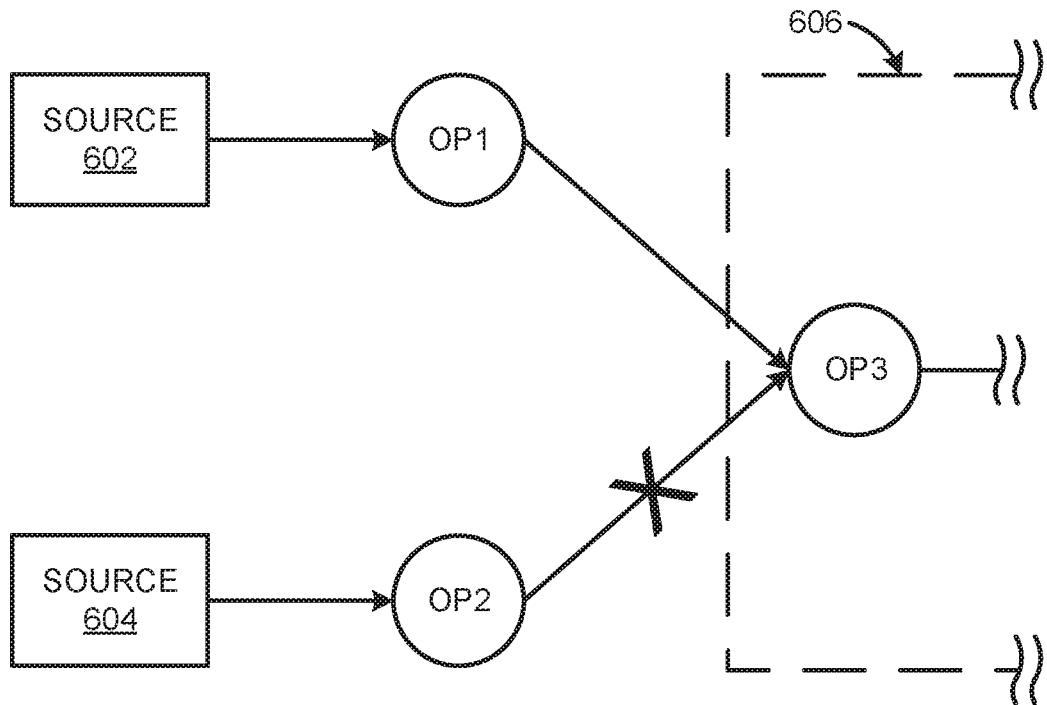
FIG. 7A illustrates a section of the operator graph of FIG. 6 after the stream manager implements tuple flow changes, in accordance with embodiments of the present disclosure.

Referring now to FIG. 7A, shown is a section of the operator graph of FIG. 6 after the stream manager implements tuple flow changes, in accordance with embodiments of the present disclosure. The section of the operator graph shown includes the two sources 602 and 604, and the first three stream operators OP1-3. The third stream operator OP3 is inside the window 606, part of which is shown in FIG. 7A.

After the tuple flow changes are implemented, the execution path between the second stream operator OP2 and the third stream operator OP3 may be severed. All other execution paths may be unchanged. The second stream operator OP2 may continue to receive tuples from the second source 604, and it may continue to process the received tuples. It may also continue to generate tuples as part of its processing, but any generated tuples will be dropped (e.g., deleted from memory) without being transmitted downstream. The first stream operator OP1 may continue to operate normally, as may the third stream operator OP3. For example, if the third stream operator OP3 aggregates and sums tuples from both the first and second operators OP1 and OP2, it may have no problems continuing without tuples from the second stream operator.

In some embodiments, the third stream operator OP3 may need to be reconfigured to properly function without receiving tuples from the second stream operator OP2. For example, if the third stream operator OP3 aggregates tuples from the first and second stream operators OP2 and OP3, and computes the sum when it has at least 5 tuples from each upstream operator, the third stream operator may need to be modified to compute work while receiving only one data stream.

Figure 7B:
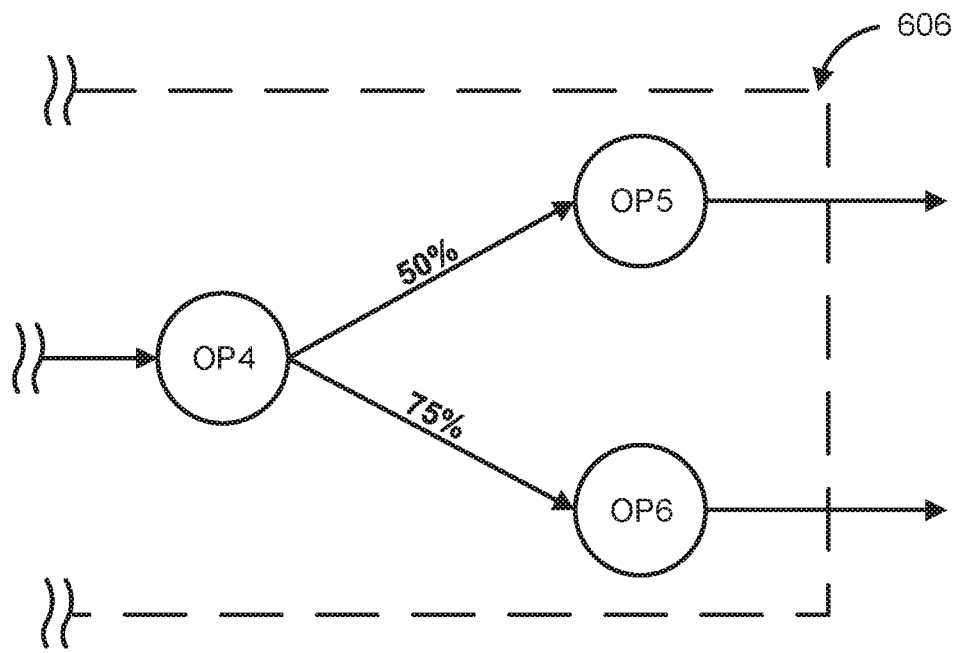
FIG. 7B illustrates another section of the operator graph of FIG. 6 after the stream manager implements tuple flow changes, in accordance with embodiments of the present disclosure.

Referring now to FIG. 7B, shown is another section of the operator graph of FIG. 6 after the stream manager implements tuple flow changes, in accordance with embodiments of the present disclosure. The section of the operator graph shown includes three stream operators OP4, OP5, and OP6. All three stream operators OP4, OP5, and OP6 are inside the window 606, part of which is shown in FIG. 7A.

After the tuple flow changes are implemented, the fourth stream operator OP4 no longer transmits all of the tuples that it generates to downstream operators. Instead, the fourth stream operator only transmits 50% of the tuples it generates to the fifth stream operator OP5 and 75% of the tuples it generates to the sixth stream operator OP6. Any remaining generated tuples are dropped (e.g., removed from memory) without being transmitted.

Figure 8:
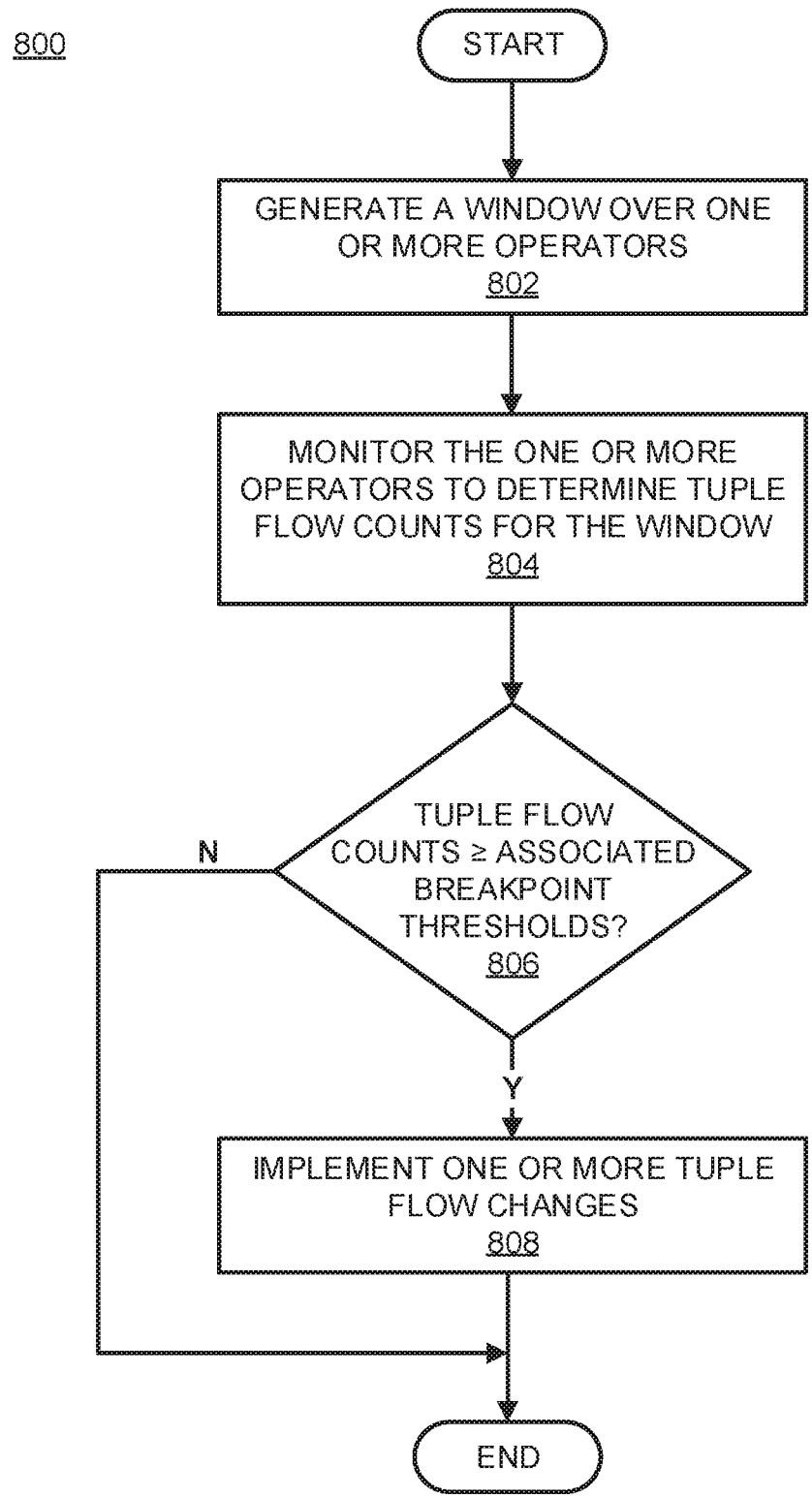
FIG. 8 is a flowchart illustrating a method for controlling data flow in a stream computing application using windows, in accordance with embodiments of the present disclosure.

Referring now to FIG. 8, shown is a flowchart illustrating a method 800 for controlling data flow in a stream computing application using windows, in accordance with embodiments of the present disclosure. In some embodiments, the method 800 may be performed by a stream manager 134 (shown in FIG. 1). In some embodiments, the method 800 may be performed by a stream operator or processing element. In some embodiments, the method 800 may be performed by a combination of stream operators, processing elements, and the stream manager. The method may begin at operation 802, wherein a stream manager may generate a window over one or more stream operators. In some embodiments, multiple windows may exist in the operator graph. The windows may cover completely different sections of the operator graph, or they may overlap. A window overlaps with another window if both windows share a stream operator or processing element.

The window may be defined by a set of windowing conditions. The windowing conditions may indicate that the window is either tumbling or sliding. The windowing conditions may also include a reset policy that determines the windowing period of the window. Additionally, the windowing conditions may include a set of breakpoint thresholds for the one or more stream operators within the window. The windowing conditions may also indicate which operators or processing elements within the operator graph are inside the window, and therefore subject to the breakpoint thresholds.

The set of breakpoint thresholds are used to control the flow of tuples within a section of the operator graph covered by the window. There are numerous thresholds that may be set for stream operators or processing elements within the window to control the flow of tuples. For example, the set of breakpoint thresholds may include a threshold that corresponds to the maximum number of tuples that may enter the window (i.e., maximum number of tuples transmitted by a stream operator outside the window to a stream operator inside the window). As another example, the set of breakpoint thresholds may include a threshold defining the maximum number of tuples that may exit the window (i.e., maximum number of tuples transmitted by a stream operator inside the window to a stream operator outside the window). A third breakpoint threshold may set the maximum number of tuples that may be generated inside the window (i.e., generated by a stream operator or processing element inside the window). The set of breakpoint thresholds may also, in some embodiments, include a threshold that sets the maximum number of tuples that may be created by a stream operator in the window, enter the window, or exit the window.

In some embodiments, the set of breakpoint thresholds may include thresholds establishing the maximum rate at which tuples are generated by, or transmitted to/from, stream operators or processing elements inside the window. For example, the set of breakpoint thresholds may include a threshold that sets the maximum rate (e.g., tuples per minute) at which tuples may enter the window. Another threshold may set the maximum rate at which tuples may exit the window, and a third threshold may set the maximum rate at which tuples may be generated inside the window. Any combination of the above mentioned thresholds may be combined.

The above mentioned thresholds are used for illustrative purposes, and one of ordinary skill in the art will recognize other thresholds that may be established to control data flow in a section of a streams computing application. Accordingly, the disclosure should not be limited to the specific thresholds described. After generating a window over one or more operators per operation 802, the stream manager may monitor the one or more operators to determine a set of tuple flow counts for the window at operation 804.

The set of tuple flow counts track the actual creation of tuples by, and the transmission of tuples to/from, stream operators within the window. The set of tuple flow counts may correspond to the set of breakpoint thresholds. For example, if the set of breakpoint thresholds includes a breakpoint threshold setting the maximum number of tuples that may enter the window, a tuple flow count that indicates the number of tuples that have entered the window may be stored and tracked. Likewise, if a breakpoint threshold sets the maximum number of tuples that may exit the window, a tuple flow count indicating the number of tuples that have exited the window may be tracked. Additional tuple flow counts may be stored, as needed, to track the number of tuples generated in the window, the rate at which tuples enter the window, the rate at which tuples exit the window, and the rate at which tuples are generated by stream operators inside the window.

After determining the set of tuple flow counts for the window per operation 804, the stream manager may determine whether a breakpoint condition has occurred by comparing the set of tuple flow counts to the set of breakpoint thresholds at operation 806. The occurrence of a breakpoint condition indicates that the flow of tuples within the window has exceeded the maximum allowed, and that one or more tuple flow changes should be implemented to reduce the flow of tuples inside the window. If none of the tuple flow counts meet or exceed their corresponding breakpoint thresholds, a breakpoint condition has not occurred and the method 800 may end. If, however, one or more tuple flow counts meet or exceed a corresponding breakpoint threshold, a breakpoint condition has occurred and, in response, the stream manager may implement one or more tuple flow changes at operation 808.

Tuple flow changes are modifications to stream operators, processing elements, or execution paths to reduce the flow of tuples inside the window. For example, in some embodiments the stream manager may halt processing at, or "turn off," a stream operator to reduce the flow of tuples inside the window. The stream operator may be inside the window (e.g., the third stream operator OP3 in FIG. 6) or outside the window (e.g., the first stream operator OP1 in FIG. 6). If the stream operator is outside the window, it may be upstream of the window (e.g., OP1) or downstream of the window (e.g., OP8). In some embodiments, the stream manager may turn off stream operators both inside and outside the window. In some embodiments, the stream manager may temporarily turn off or suspend operation at all stream operators in the operator graph, stopping each of the stream operator from processing tuples. Each of the stream operators or processing elements may be prioritized according to the importance of the stream operator or its associated job, the amount of data being sent by the stream operator, or how downstream operators use the data sent by the stream operator.

Each stream operator may be prioritized individually or by its association with a job. For example, a stream operator may be part of a job that processes information submitted by a client, and as such, may be given a higher priority than a stream operator that performs routine system maintenance that may be delayed or executed at a different time. Alternatively, the priority of each job or stream operator may be set by a system administrator. The stream manager may then halt processing at the stream operator with the lowest priority.

The stream operators may be prioritized based on the amount of data sent on a respective data path. For example, a first stream operator and a second stream operator may both send tuples to a third stream operator. All three stream operators may be in the same window. The first stream operator may send three times as many tuple as the second stream operator. Therefore, in some embodiments, the first stream operator may be given a higher priority because the third stream operator may not receive enough data to operate properly if the first stream operator is turned off. In another embodiment, the first stream operator may be turned off because it is transmitting the most data and is likely the greatest cause of the tuple flow inside the window exceeding maximum thresholds.

The stream operators may be prioritized based on how their output tuples are used by downstream operators. For example, tuples sent by a first stream operator may be used by several downstream operators. Meanwhile, tuples sent by a second stream operator may only be used by a single downstream operator. Accordingly, the first stream operator may be given a greater priority than the second stream operator. In some embodiments, however, the opposite may be true because shutting off the first stream operator may cause a greater reduction in the flow of tuples inside the window. This may be because, e.g., stream operators downstream from the first stream operator may be configured to process tuples from the first stream operator and generate additional tuples, increasing the flow of tuples within the window.

Any combination of the above mentioned prioritization methods may be combined in a weighted formula. Furthermore, the listed methods of prioritizing stream operator, processing elements, and data paths are for illustrative purposes only. Any method that prioritizes stream operators, processing elements, and data paths, and is compatible with the functionality described herein, is contemplated by this disclosure.

In some embodiments, the tuple flow changes may cause one or more stream operators to drop tuples (e.g., remove received tuples from memory or refuse to receive new tuples) without processing them. In some embodiments, the tuples may be dropped according to some algorithm or pattern (e.g., every third tuple is dropped). In some embodiments, certain types of tuples may be dropped. For example, if stream operator receives and processes both data and metadata, the tuple flow change may indicate that the stream operator drops the metadata tuples without processing them. In some embodiments, individual stream operators may be reconfigured to drop tuples at different rate. For example, a first stream operator in the operator graph may drop 50% of the tuples sent to it, while a second stream operator in the same operator graph may drop 25% of tuples sent to it.

The stream operator that is reconfigured to drop tuples may be inside the window (e.g., the third stream operator OP3 in FIG. 6) or outside the window (e.g., the first stream operator OP1 in FIG. 6). If the stream operator is outside the window, it may be upstream of the window (e.g., OP1) or downstream of the window (e.g., OP8). In some embodiments, the tuple flow changes may dictate that stream operators both inside and outside the window drop tuples.

In some embodiments, the implemented tuple flow changes may cause one or more stream operators to not generate tuples that they are otherwise configured to generate. The stream operator may determine which tuples should not be generated tuples according to an algorithm or pattern. For example, the stream operator may only generate two thirds of its normal output. Therefore, the stream operator may determine that it should not generate every third tuple that it normally would. In some embodiments, the stream operator may only generate tuples carrying certain information, while not generating tuples that carry different information. For example, if a stream operator is configured to process image data and generate a first tuple that carries a black-and-white version of the image, and a second tuple that carries metadata (e.g., information about the camera that took the image), the tuple flow change may dictate that only the black-and-white image data should be generated. The tuple of metadata would therefore not be generated by the stream operator.

In some embodiments, individual stream operators may be reconfigured to generate different percentages of their normally generated tuples. For example, implementation of the tuple flow changes may cause a first stream operator in the operator graph to only generate 33% of the tuples it normally generates, while a second stream operator in the same operator graph may only generate 25% of tuples it normally generates.

The stream operator that is reconfigured to not generate all of its tuples may be inside the window (e.g., the third stream operator OP3 in FIG. 6) or outside the window (e.g., the first stream operator OP1 in FIG. 6). If the stream operator is outside the window, it may be upstream of the window (e.g., OP1) or downstream of the window (e.g., OP8). In some embodiments, the stream manager may dictate that stream operators both inside and outside the window should not generate as many tuples as they would under normal operations.

In some embodiments, the tuple flow changes may include limiting the number of tuples transmitted by a stream operator. The stream operator may determine which tuples will not be transmitted according to an algorithm or pattern. For example, the stream operator may only transmit two thirds of its normal output. Therefore, the stream operator may determine that it should not transmit every third tuple that it generates. In some embodiments, the stream operator may only transmit tuples carrying certain information, and not transmit tuples that carry different information. For example, if a stream operator is configured to process image data and generate a first tuple that carries a black-and-white version of the image, and a second tuple that carries metadata (e.g., information about the camera that took the image), the tuple flow change may dictate that only the black-and-white image data should be transmitted downstream. The tuple of metadata may still be generated by the stream operator, but it would not be transmitted.

In some embodiments, individual stream operators may be reconfigured to transmit different percentages of their generated tuples. For example, implementation of the tuple flow changes may cause a first stream operator in the operator graph to only transmit 33% of the tuples it generates, while a second stream operator in the same operator graph may only transmit 25% of the tuples it generates. In some embodiments, a stream operator that transmits tuples to two downstream operators may transmit a different percentage of its generated tuples to each of the downstream operators. An example of the implementation of this type of tuple flow change is discussed in reference to FIG. 7B.

The stream operator that is reconfigured to not transmit all of its tuples may be inside the window (e.g., the third stream operator OP3 in FIG. 6) or outside the window (e.g., the first stream operator OP1 in FIG. 6). If the stream operator is outside the window, it may be upstream of the window (e.g., OP1) or downstream of the window (e.g., OP8). In some embodiments, the tuple flow changes may dictate that stream operators both inside and outside the window should not transmit all of the tuples that they generate.

The tuple flow changes may also include replacing one or more stream operators with a "light" version of the stream operators. The light version of a stream operator may perform similar operations as the standard version, but the light version may be configured to generate fewer tuples. For example, a stream operator may import data from a digital camera. The stream operator may be configured to perform some operation on the tuples received, and then output two tuples: one tuple of image data and one tuple of metadata. The light version of the stream operator may be configured to only generate and transmit the image data.

The stream operator that is set to run as a light version may be inside the window (e.g., the third stream operator OP3 in FIG. 6) or outside the window (e.g., the first stream operator OP1 in FIG. 6). If the stream operator is outside the window, it may be upstream of the window (e.g., OP1) or downstream of the window (e.g., OP8). In some embodiments, the tuple flow changes may include setting stream operators both inside and outside the window to run as light versions.

In some embodiments, the tuple flow changes may include removing, or severing, one or more execution paths. In these cases, all of the stream operators may continue to work without modification, except that the stream operators that are configured to transmit tuples along the severed execution path may no longer do so. For example, a first stream operator may be configured to perform an operation on a tuple and to output two tuples, one to a second stream operator and one to a third stream operator. If the execution path between the first and third stream operators is severed, the first stream operator may continue to perform the operation on the tuples it receives and send tuples to the second stream operator. The only change may be that the first stream operator will no longer transmit tuples to the third stream operator. An example of an execution path being severed is discussed in reference to FIG. 7A.

The execution path that is removed may be inside the window (e.g., the execution path between the third stream operator OP3 and the fourth stream operator OP4 in FIG. 6), outside the window (the execution path between the first source 602 and the first stream operator OP1 in FIG. 6), or cross over the window boundary (e.g., the execution path between the first stream operator OP1 and the third stream operator OP3). If the removed execution path is outside the window, it may be upstream of the window (e.g., between the first source 602 and the first stream operator OP1) or downstream of the window (e.g., between the seventh stream operator OP7 and the first sink 608). In some embodiments, the tuple flow changes may dictate that execution paths both inside and outside the window be severed.

Any combination of the above mentioned tuple flow changes may be combined. For example, the changes shown in FIGS. 7A and 7B may be implemented together to alter the streams computing application shown in FIG. 6. Furthermore, the listed tuple flow changes are discussed for illustrative purposes only. Any change to a stream operator, processing element, or data path that reduces data flow within the window and is otherwise compatible with the functionality described herein is contemplated by this disclosure. After the tuple flow changes have been implemented, the method 800 may end.

In some embodiments, all the tuple flow changes may be implemented when a tuple flow count exceeds its corresponding breakpoint threshold. In other embodiments, one or more, but not all, of the tuple flow changes may be implemented when a tuple flow count exceeds its corresponding breakpoint threshold. In these embodiments, the stream manager may implement some of the tuple flow changes, reset the window, and, after resetting the window, begin monitoring the tuple flow counts. If the implemented tuple flow changes have reduced the flow of tuples inside the window, the method 800 may end. If, however, a tuple flow count again exceeds its corresponding threshold, the stream manager may implement more of the tuple flow changes. This process may be repeated until the tuple flow counts no longer exceed their corresponding thresholds, or until all of the tuple flow changes have been implemented.

In some embodiments, all tuple flow changes may be temporary. For example, the implemented tuple flow changes may be undone at the end of the windowing period, or at the conclusion of a tumbling window. Alternatively, the tuple flow changes may exist for the duration of two or more windowing periods. In some embodiments, the tuple flow changes may continue until the stream computing application is restarted, or until an administrator reverts the changes. In some embodiments, some of the tuple flow changes may be temporary and may be undone at the end of a window, while others may only be reverted by an administrator, or when the stream computing application is restarted.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for controlling the flow of tuples in a stream computing application, the method comprising:
receiving a stream of tuples to be processed by the stream computing application deployed on a network, the stream computing application including a plurality of stream operators executing on one or more computer processors, the plurality of stream operators being arranged according to an operator graph for the stream computing application;
generating a window over two of more stream operators of the plurality of stream operators, the window including a breakpoint threshold;
determining a tuple flow count for the window, the tuple flow count corresponding to the breakpoint threshold;
determining that a breakpoint condition has occurred by comparing the tuple flow count to the breakpoint threshold;
modifying, during runtime, in response to determining that the breakpoint condition has occurred, the stream computing application by dynamically editing processing elements and the stream operators of the stream computing application; and
implementing, on the network in response to modifying, the processing elements and stream operators to actuate a tuple flow change to the stream computing application; and
modifying a first stream operator to process a first portion of tuples received by the first stream operator and not process a second portion of tuples received by the first stream operator, wherein the first portion of tuples includes tuples of a first type and the second portion of tuples includes tuples of a second type, wherein implementing the tuple flow change comprises severing an execution path between two stream operators, and wherein stream operators that are configured to transmit tuples along the severed execution path no longer transmit tuples along the severed execution path.

2. The method of claim 1, wherein the window is defined by a set of windowing conditions, the set of windowing conditions including the breakpoint threshold and a reset policy, the method further comprising:

determining that the reset policy has triggered; and
resetting, in response to determining that the reset policy has triggered, the tuple flow count for the window.

3. The method of claim 2, the method further comprising undoing, in response to determining that the reset policy has triggered, the modification to the stream computing application.

4. The method of claim 2, wherein the reset policy is a time interval, and the determining that the reset policy has triggered comprises determining that an amount of time since generating the window exceeds the time interval.

5. The method of claim 1, wherein the breakpoint threshold sets a maximum number of tuples that are permitted to exit the window during a windowing period, wherein the tuple flow count is a number of tuples that have exited the window during the windowing period, and wherein determining that the breakpoint condition has occurred includes determining that the number of tuples that have exited the window during the windowing period exceeds the maximum number of tuples.

6. The method of claim 1, wherein the breakpoint threshold sets a maximum number of tuples that the two or more stream operators inside the window are permitted to generate during a windowing period.

7. The method of claim 6, wherein the tuple flow count includes a number of tuples generated by the two or more stream operators inside the window during the windowing period, and wherein the determining that the breakpoint condition has occurred comprises:

comparing the number of tuples generated by the two or more stream operators to the maximum number of tuples that the two or more stream operators inside the window are permitted to generate during the windowing period; and
determining that number of tuples generated by the two or more stream operators exceeds the maximum number of tuples that the two or more stream operators inside the window are permitted to generate.

8. The method of claim 1, wherein the operator graph includes the first stream operator, a second stream operator, and a third stream operator, each of the first, second, and third stream operators being inside the window, the first and second stream operators being configured to transmit tuples to the third stream operator, wherein the third stream operator is configured to receive tuples from the first stream operator and from the second stream operator, aggregate the received tuples, and perform an operation on the aggregated tuples, and
wherein the modifying the stream computing application comprises:
severing an execution path between the first stream operator and the third stream operator; and
modifying the third stream operator to perform the operation in response to aggregating a third number of tuples from the second stream operator, wherein the modified third stream operator is configured to perform the operation without tuples from the first stream operator.

9. The method of claim 1, wherein the modifying the stream computing application comprises replacing a second stream operator with a light version of the second stream operator.

10. A system for controlling the flow of tuples in a stream computing application to reduce bottlenecking comprising:

two or more processors; and
a memory communicatively coupled to the two or more processors, the memory including program code that, when executed, causes at least one of the two or more processors to:
receive a stream of tuples to be processed by the stream computing application deployed on a network, the stream computing application including a plurality of stream operators executing on one or more computer processors, the plurality of stream operators being arranged according to an operator graph for the stream computing application;
generate a window over two or more stream operators of the plurality of stream operators, the window being defined by a set of windowing conditions, the set of windowing conditions including a set of breakpoint thresholds;
determine a set of tuple flow counts for the window, the set of tuple flow counts corresponding to the set of breakpoint thresholds;
determine that a breakpoint condition has occurred by comparing the set of tuple flow counts to the set of breakpoint thresholds;
modifying, during runtime, in response to determining that the breakpoint condition has occurred, the stream computing application by dynamically editing processing elements and the stream operators of the stream computing application; and
implementing, on the network in response to modifying, the processing elements and stream operators to actuate a tuple flow change to the stream computing application; and
modifying a first stream operator to process a first portion of tuples received by the first stream operator and not process a second portion of tuples received by the first stream operator, wherein the first portion of tuples includes tuples of a first type and the second portion of tuples includes tuples of a second type,
wherein implementing the tuple flow change comprises severing an execution path between two stream operators, and wherein stream operators that are configured to transmit tuples along the severed execution path no longer transmit tuples along the severed execution path.

11. The system of claim 10, wherein the set of windowing conditions further includes a reset policy, wherein the program code, when executed, further causes the at least one processor to:

determine that the reset policy has triggered; and
reset, in response to determining that the reset policy has triggered, the set of tuple flow counts for the window.

12. The system of claim 10, wherein a first breakpoint threshold of the set of breakpoint thresholds defines a maximum number of tuples that the two or more stream operators are permitted to generate during a windowing period, wherein a first tuple flow count of the set of tuple flow counts is a number of tuples that the two or more stream operators have generated during the windowing period, and wherein determining that the breakpoint condition has occurred includes determining that the number of tuples that the two or more stream operators have generated during the windowing period exceeds the maximum number of tuples.

13. The system of claim 10, wherein implementing the tuple flow change comprises:
   determining, for the first stream operator in the operator graph, a first priority, wherein the first priority is based on an amount of data sent by the first stream operator to downstream stream operators;
   determining, for a second stream operator in the operator graph, a second priority, wherein the second priority is based on an amount of data sent by the second stream operator to downstream stream operators;
   comparing the first priority to the second priority;
   determining, based on the comparing, that the first stream operator has a higher priority than the second stream operator; and
   modifying, in response to determining that the first stream operator has a higher priority than the second stream operator, the second stream operator.

14. A computer program product for processing a stream of tuples in a stream computing application, the computer program product comprising a computer readable storage medium having program code embodied therein, the program code comprising computer readable program code configured to cause one or more computer processors to perform a method comprising:
   receiving a stream of tuples to be processed by the stream computing application deployed on a network, the stream computing application including a plurality of stream operators executing on the one or more computer processors, the plurality of stream operators being arranged according to an operator graph for the stream computing application;
   generating a window over two or more stream operators of the plurality of stream operators, the window including a breakpoint threshold;
   determining a tuple flow count for the window, the tuple flow count corresponding to the breakpoint threshold;
   determining that a breakpoint condition has occurred by comparing the tuple flow count to the breakpoint threshold;
   modifying, during runtime, in response to determining that the breakpoint condition has occurred, the stream computing application by dynamically editing processing elements and the stream operators of the stream computing application; and
   implementing, on the network in response to modifying, the processing elements and stream operators to actuate a tuple flow change to the stream computing application; and
   modifying a first stream operator to process a first portion of tuples received by the first stream operator and not process a second portion of tuples received by the first stream operator, wherein the first portion of tuples includes tuples of a first type and the second portion of tuples includes tuples of a second type,
   wherein implementing the tuple flow change comprises severing an execution path between two stream operators, and
wherein stream operators that are configured to transmit tuples along the severed execution path no longer transmit tuples along the severed execution path.

15. The computer program product of claim 14, wherein the breakpoint threshold sets a maximum rate at which the two or more stream operators inside the window are permitted to generate tuples during a windowing period.

16. The computer program product of claim 14, wherein the implementing the tuple flow change comprises:
   determining, for the first stream operator in the operator graph, a first priority, wherein the first priority is based on a number of stream operators downstream from the first stream operator;
   determining, for a second stream operator in the operator graph, a second priority, wherein the second priority is based on a number of stream operators downstream from the second stream operator;
   comparing the first priority to the second priority;
   determining, based on the comparing, that the first stream operator has a higher priority than the second stream operator; and
   modifying, in response to determining that the first stream operator has a higher priority than the second stream operator, the second stream operator.

17. The computer program product of claim 14, wherein the implementing the tuple flow change comprises stopping processing at the first stream operator.

18. The computer program product of claim 14, wherein the implementing the tuple flow change comprises:
   determining that the first stream operator in the operator graph and a second stream operator in the operator graph are configured to transmit tuples to a third stream operator in the operator graph;
   determining that the third stream operator requires data from the first stream operator to operate;
   determining that the third stream operator does not require data from the second stream operator to operate;
   assigning, in response to determining that the third stream operator requires data from the first stream operator and that the third stream operator does not require data from the second stream operator, the first stream operator a higher priority than the second stream operator; and
   modifying the second stream operator based on the priorities of the first and second stream operators.

* * * * *